United States Patent
Hata et al.

(10) Patent No.: US 10,941,865 B2
(45) Date of Patent: Mar. 9, 2021

(54) STEAM VALVE, VALVE AND STEAM TURBINE FACILITY

(71) Applicant: Mitsubishi Hitachi Power Systems, Ltd., Yokohama (JP)

(72) Inventors: Masaki Hata, Yokohama (JP); Shoichi Okawara, Yokohama (JP); Kazuhito Kawamura, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 31 days.

(21) Appl. No.: 16/099,350

(22) PCT Filed: May 19, 2017

(86) PCT No.: PCT/JP2017/018760
§ 371 (c)(1),
(2) Date: Nov. 6, 2018

(87) PCT Pub. No.: WO2017/200067
PCT Pub. Date: Nov. 23, 2017

(65) Prior Publication Data
US 2019/0178388 A1    Jun. 13, 2019

(30) Foreign Application Priority Data

May 20, 2016 (JP) .............................. JP2016-101334

(51) Int. Cl.
*F16K 1/32* (2006.01)
*F01D 17/10* (2006.01)
(Continued)

(52) U.S. Cl.
CPC ................ *F16K 1/32* (2013.01); *F01D 17/10* (2013.01); *F01D 25/00* (2013.01); *F16K 1/34* (2013.01);
(Continued)

(58) Field of Classification Search
CPC ...... F16K 1/34; F16K 1/32; F16K 1/44; F16K 1/38; F16K 1/443; F01D 25/00; F01D 17/10
See application file for complete search history.

(56) References Cited

U.S. PATENT DOCUMENTS 433,543 A * 8/1890 Schreidt .................... F16K 1/44
137/599.16
2,666,452 A * 1/1954 Sheppard .............. F01D 17/145
251/75

(Continued)

FOREIGN PATENT DOCUMENTS

JP    S50-037027 A    4/1975
JP    S57-144354 A    9/1982
(Continued)

OTHER PUBLICATIONS

Office Action dated Jul. 3, 2019, issued in counterpart CN application No. 201780028554.4, with English translation. (18 pages).
(Continued)

*Primary Examiner* — Umashankar Venkatesan
(74) *Attorney, Agent, or Firm* — Westerman, Hattori, Daniels & Adrian, LLP

(57) ABSTRACT

A valve includes a valve stem, a first valve body disposed on a distal end side of the valve stem and configured to be driven via the valve stem, a first valve seat on which the first valve body is seatable, an auxiliary seat surface extending along a direction transverse to an axial direction of the valve stem, an auxiliary seat portion disposed on a proximal end side of the valve stem with respect to the first valve body and configured to abut on the auxiliary seat surface when the first valve body is closed, and a biasing member capable of generating a biasing force along the axial direction of the valve stem.

15 Claims, 6 Drawing Sheets

(51) Int. Cl.
*F01D 25/00* (2006.01)
*F16K 1/34* (2006.01)
*F16K 1/44* (2006.01)
*F16K 1/38* (2006.01)

(52) U.S. Cl.
CPC ............... *F16K 1/44* (2013.01); *F16K 1/38* (2013.01); *F16K 1/443* (2013.01)

(56) References Cited

U.S. PATENT DOCUMENTS

| | | | | |
|---|---|---|---|---|
| 3,459,212 | A | * | 8/1969 | Campion ............... F16K 24/02 137/312 |
| 3,529,630 | A | * | 9/1970 | Podolsky ................ F16K 1/44 137/630.13 |
| 3,892,382 | A | | 7/1975 | Dresner |
| 4,092,214 | A | * | 5/1978 | Schabert ............... F16K 17/168 137/599.16 |
| 9,650,910 | B2 | * | 5/2017 | Futahashi ............... F01D 17/10 |
| 9,670,794 | B2 | * | 6/2017 | Takemura ............. F16K 31/163 |
| 10,480,662 | B2 | * | 11/2019 | Futahashi ............... F01D 25/00 |
| 2014/0000258 | A1 | * | 1/2014 | Nishimoto .............. F01K 21/00 60/643 |
| 2017/0022841 | A1 | * | 1/2017 | Nakamura ............. F16K 1/307 |
| 2018/0340627 | A1 | * | 11/2018 | Futahashi ............... F16K 31/16 |

FOREIGN PATENT DOCUMENTS

| | | | |
|---|---|---|---|
| JP | S58-134284 | A | 8/1983 |
| JP | H02-125285 | U | 10/1990 |
| JP | H05-000965 | U | 1/1993 |
| JP | 2003-329158 | A | 11/2003 |
| JP | 2005-321061 | A | 11/2005 |
| JP | 2012-021568 | A | 2/2012 |

OTHER PUBLICATIONS

International Search Report dated Aug. 1, 2017, issued in counterpart application No. PCT/JP2017/018760, with English translation. (12 pages).

Notification of Transmittal of Translation of the International Preliminary Report on Patentability (Form PCT/IB/326) issued in counterpart International Application No. PCT/JP2017/018760 dated Nov. 29, 2018 with Forms PCT/IB/373, PCT/IB/338 and PCT/ISA/237, with English translation. (16 pages).

Office Action dated Oct. 22, 2019, issued in counterpart KR Application No. 10-2018-7032328, with English translation. (18 pages).

Office Action dated Feb. 25, 2020, issued in counterpart JP application No. 2016-101334, with English translation. (11 pages).

* cited by examiner

STEAM VALVE, VALVE AND STEAM TURBINE FACILITY

TECHNICAL FIELD

The present disclosure relates to a valve and a steam turbine facility including the same.

BACKGROUND ART

Conventionally, many attempts have been made to prevent leakage of a fluid when a valve is closed.

For instance, Patent Document 1 discloses a steam valve for use in a steam turbine. In this steam valve, when the valve is closed, a seat surface of a valve body rests on a valve seat to shut off a flow of steam, and a backseat disposed on an enlarged-diameter portion of a valve stem abuts on a bonnet to prevent leakage of steam passing between the valve stem connected to the valve body and the bonnet into which the valve stem is inserted.

CITATION LIST

Patent Literature

Patent Document 1: JP2012-21568A

SUMMARY

Problems to be Solved

The steam valve disclosed in Patent Document 1 are seated simultaneously at two seat portions, namely, the seat surface of the valve body and the backseat of the valve stem, to block the leakage and the flow of steam when the valve is closed. At this time, the valve is often seated at only one of the two seat portions. In this case, both the seat portions are not reliably sealed, and the leakage of steam cannot be reduced.

In this regard, Patent Document 1 fails to specifically describe measure against seat failure at the two seat portions.

In view of the above, an object of at least one embodiment of the present invention is to provide a valve and a steam turbine facility whereby it is possible to reduce the leakage of a fluid.

Solution to the Problems (1) A valve according to at least one embodiment of the present invention comprises: a valve stem; a first valve body disposed on a distal end side of the valve stem and configured to be driven via the valve stem; a first valve seat on which the first valve body is seatable; an auxiliary seat surface extending along a direction transverse to an axial direction of the valve stem; an auxiliary seat portion disposed on a proximal end side of the valve stem with respect to the first valve body and configured to abut on the auxiliary seat surface when the first valve body is closed; and a biasing member capable of generating a biasing force along the axial direction of the valve stem, wherein one of the first valve body or the auxiliary seat portion is displaceable in the axial direction relative to the valve stem and is biased toward a corresponding one of the first valve seat or the auxiliary seat surface by the biasing member.

In the above configuration (1), one of the first valve body or the auxiliary seat portion is displaceable in the axial direction of the valve stem relative to the valve stem and is biased toward a corresponding one of the first valve seat or the auxiliary seat surface by the biasing member. With this configuration, when the first valve body is closed, the other of the first valve body or the auxiliary seat portion is seated or abuts on the other of the first valve seat or the auxiliary seat surface while the one of first valve body or the auxiliary seat portion is pressed to the corresponding one of the first valve seat or the auxiliary seat surface by the biasing member. Thus, it is possible to ensure sealing at both the first valve body and the auxiliary seat portion. Consequently, it is possible to reduce the leakage of a fluid in the valve.

(2) In some embodiments, in the above configuration (1), the first valve body is displaceable in the axial direction relative to the valve stem and is biased toward the first valve seat by the biasing member disposed between the first valve body and the valve stem.

In the above configuration (2), the first valve body is displaceable in the axial direction of the valve stem relative to the valve stem and is biased toward the first valve seat by the biasing member. With this configuration, when the first valve body is closed, the auxiliary seat portion abuts on the auxiliary seat surface while the first valve body is pressed to the first valve seat by the biasing member. Thus, it is possible to ensure sealing at both the first valve body and the auxiliary seat portion. Consequently, it is possible to reduce the leakage of a fluid in the valve.

(3) In some embodiments, in the above configuration (2), the valve stem has a valve-stem-side engagement portion including a projection or a recess projecting or recessed in a radial direction of the valve stem on the distal end side, the first valve body has a valve-body-side engagement portion including a recess or a projection recessed or projecting in the radial direction so as to engage with the valve-stem-side engagement portion, and the valve-stem-side engagement portion is loosely fitted to the valve-body-side engagement portion so that the first valve body is displaceable in the axial direction relative to the valve stem.

In the above configuration (3), the valve-stem-side engagement portion is loosely fitted to the valve-body-side engagement portion. That is, a gap is formed between the valve-stem-side engagement portion and the valve-body-side engagement portion in the axial direction of the valve stem. This gap allows the first valve body to be displaced relative to the valve stem in the axial direction, so that the first valve body can be appropriately pressed to the first valve seat by the biasing force of the biasing member. Thus, it is possible to ensure sealing at both the first valve body and the auxiliary seat portion.

(4) In some embodiments, in the above configuration (3), the valve stem has the projection projecting outward in the radial direction as the valve-stem-side engagement portion, the projection serving as the valve-stem-side engagement portion has: a first surface directed to a valve-opening side in the axial direction of the valve stem and facing the first valve body; and a second surface directed to a valve-closing side in the axial direction of the valve stem and facing the first valve body, and a gap is provided in at least one of a portion between the first surface and the first valve body or a portion between the second surface and the first valve body.

In the above configuration (4), a gap is provided in at least one of a portion between the first valve body and the first surface or a portion between the first valve body and the second surface of the projection which is the valve-stem-side engagement portion. That is, a gap is formed between the projection as the valve-stem-side engagement portion and the first valve body in the axial direction of the valve stem. This gap allows the first valve body to be displaced relative to the valve stem in the axial direction, so that the first valve body can be pressed to the first valve seat by the biasing force of the biasing member. Thus, it is possible to ensure sealing at both the first valve body and the auxiliary seat portion.

(5) In some embodiments, in the above configuration (4), when the first valve body is seated on the first valve seat, a gap is provided in each of the portion between the first surface and the first valve body and the portion between the second surface and the first valve body.

In the above configuration (5), when the first valve body is closed, a gap (first gap) is formed between the first valve body and the first surface directed to the valve-opening side of the projection as the valve-stem-side engagement portion and a gap (second gap) is formed between the first valve body and the second surface directed to the valve-closing side of the projection as the valve-stem-side engagement portion.

The first gap formed on the valve-opening side of the valve-stem-side engagement portion (projection) when the first valve body is closed prevents the first valve body from being lifted by the valve stem when the valve stem is contracted due to a reduction in temperature of the valve stem in response to the stop of the flow a fluid (e.g., steam) into the valve. Further, the alignment of the first valve body can be maintained.

On the other hand, the second gap formed on the valve-closing side of the valve-stem-side engagement portion (projection) when the first valve body is closed enables both the first valve body and the auxiliary seat portion to be sealed well even if the first valve body and the auxiliary seat portion cannot be simultaneously seated. Further, the second gap can absorb thermal expansion difference between various components including the valve stem and the first valve body.

(6) In some embodiments, in any one of the above configurations (2) to (5), the valve stem has a valve stem hole extending in the axial direction on the distal end side and opening to a distal end surface of the valve stem, and the biasing member is a spring disposed within the valve stem hole.

In the above configuration (6), the spring guided by the valve stem hole extending in the axial direction of the valve stem can impart a biasing force in the axial direction to the first valve body. Thereby, it is possible to appropriately press the first valve body to the first valve seat by the biasing member, and it is possible to ensure sealing at both the first valve body and the auxiliary seat portion.

(7) In some embodiments, in the above configuration (6), the valve further comprises a biasing-force receiving portion disposed between the first valve body and the biasing member to transmit the biasing force to the first valve body, the biasing-force receiving portion engaging with the valve stem hole and configured to be guided by the valve stem hole in the axial direction.

With the above configuration (7), a biasing force along the axial direction is imparted to the first valve body via the biasing-force receiving portion configured to be guided by the valve stem hole in the axial direction, whereby it is possible to more appropriately press the first valve body to the first valve seat. Thus, it is possible to ensure sealing of the valve at both the first valve body and the auxiliary seat portion.

(8) In some embodiments, in the above configuration (6) or (7), the biasing-force receiving portion at least partially has a spherical portion adjacent to the first valve body, and the spherical portion is configured to come into contact with the first valve body.

With the above configuration (8), since the biasing-force receiving portion is brought into contact with the first valve body at the spherical portion, it is possible to reduce stress concentration, compared with a case where a corner portion comes into contact with the first valve body. Thus, it is possible to improve the lifetime of the biasing-force receiving portion or the first valve body.

(9) In some embodiments, in any one of the above configurations (6) to (8), the biasing-force receiving portion has a protrusion engaged with a groove formed in the first valve body so as to be recessed toward the axial direction of the valve stem.

With the above configuration (9), the protrusion engaged with the groove formed in the first valve body so as to be recessed in the axial direction of the valve stem enables the biasing-force receiving portion to be reliably centered at the central axis. Thereby, a biasing force along the axial direction can be reliably imparted to the first valve body, and the first valve body can be more reliably pressed to the valve seat. Thus, it is possible to ensure sealing of the valve at both the first valve body and the auxiliary seat portion.

(10) In some embodiments, in any one of the above configurations (1) to (9), the valve further comprises a second valve body having an inner wall surface forming the first valve seat and an inner space defined by the inner wall surface, the inner space receiving the first valve body; and a valve casing having a second valve seat on which the second valve body is seatable, wherein, when the second valve body is in an open position away from the second valve seat, one of the valve stem or the first valve body is biased in a valve-opening direction of the first valve body with respect to the second valve body.

In the above configuration (10), when the valve is to be closed and the second valve body (primary valve) is in an open position, the valve stem or the first valve body (secondary valve) is biased in the valve-opening direction of the first valve body, with respect to the second valve body. Thus, when the second valve body moves from an open position to a closed position, the first valve body moves together with the second valve body in the valve-closing direction of the second valve body while the first valve body is kept on the valve-opening side of the first valve body in the inner space of the second valve body. Then, after the second valve body is seated on the second valve seat, the first valve body is seated on the first valve body formed by the inner wall surface of the second valve body. Thus, with the above configuration (10), since the second valve body and the first valve body are seated stepwise when the valve is closed, the mass of the valve body that collides with the valve seat is reduced, compared with a case where the second valve body and the first valve body are collectively seated (for instance, a case where the second valve body is seated on the second valve seat while the first valve body is seated on the second valve body). This reduces an impact force generated on the valve body and the valve seat by collision between the valve body and the valve seat. Thus, it is possible to reduce damage of the seat portion.

(11) In some embodiments, in the above configuration (10), the second valve body includes a first bush, positioned on a radially outer side of the valve stem, for guiding the valve stem in the axial direction of the valve stem, and when the second valve body is in the open position, a first chamber formed between the first bush and the valve stem has a lower pressure than a pressure of the inner space of the second valve body receiving the first valve body.

In the above configuration (11), when the second valve body is in the open position, the pressure of the first chamber formed between the first bush and the valve stem becomes lower than the pressure of the inner space of the second valve body, through the communication channel. Consequently, a biasing force in the valve-opening direction of the secondary valve acts on the valve stem on the basis of the difference in pressure between the first chamber and the inner space of the second valve body. Thus, with the above configuration (11), since the second valve body and the first valve body are seated stepwise by the biasing force based on the difference in pressure when the valve is closed, the mass of the valve body that collides with the valve seat is reduced, compared with a case where the second valve body and the first valve body are collectively seated. This reduces an impact force generated on the valve body and the valve seat by collision between the valve body and the valve seat. Thus, it is possible to reduce damage of the seat portion.

(12) In some embodiments, in the above configuration (11), the first chamber is a lift gap allowing the valve stem and the first valve body to be lifted with respect to the second valve body.

With the above configuration (12), using the lift gap for lifting the valve stem and the first valve body with respect to the second valve body, it is possible to form the first chamber having a lower pressure than the inner space of the second valve body. This reduces an impact force generated on the valve body and the valve seat by collision between the valve body and the valve seat. Thus, it is possible to reduce damage of the seat portion.

(13) In some embodiments, in the above configuration (11) or (12), the valve stem has a communication channel extending in the axial direction within the valve stem, and the valve is configured so that when the second valve body is in the open position, the first chamber communicates with a second chamber via the communication channel, the second chamber having a lower pressure than that of the first chamber, and when the second valve body is in a closed position, the first chamber does not communicate with the second chamber.

In the above configuration (13), when the second valve body is in the open position, the first chamber communicates with the second chamber via the communication channel. This reduces the pressure in the first chamber and generates a biasing force in the valve-opening direction of the first valve body on the basis of the difference in pressure between the first chamber and the inner space of the second chamber.

On the other hand, in the above configuration (13), when the second valve body is in the closed position, the first chamber does not communicate with the second chamber, so that a leaking flow of a fluid from the first chamber to second chamber is shut off. Thereby, it is possible to reduce the leakage of the fluid from the inner space of the second valve body through a gap between the valve stem and the first bush.

(14) In some embodiments, in the above configuration (13), the valve casing has the auxiliary seat surface extending along the direction transverse to the axial direction of the valve stem, the valve stem includes the auxiliary seat portion abuttable on the auxiliary seat surface when the second valve body is in the closed position, and when the second valve body is in the closed position, the communication channel is separated from the second chamber by an abutting portion between the auxiliary seat portion and the auxiliary seat surface.

With the above configuration (14), when the second valve body is in the closed position, the abutting portion separating the communication channel from the second chamber reliably shuts off the flow of the fluid from the first chamber to the second chamber. Thereby, it is possible to reduce the leakage of the fluid from the inner space of the second valve body through a gap between the valve stem and the first bush.

(15) A steam turbine facility according to at least one embodiment of the present invention comprises: the valve described in any one of the above (1) to (14); and a steam turbine disposed downstream of the valve.

In the above configuration (15), one of the first valve body or the auxiliary seat portion is displaceable in the axial direction of the valve stem relative to the valve stem and is biased toward a corresponding one of the first valve seat or the auxiliary seat surface by the biasing member. With this configuration, when the first valve body is closed, the other of the first valve body or the auxiliary seat portion is seated or abuts on the other of the first valve seat or the auxiliary seat surface while the one of first valve body or the auxiliary seat portion is pressed to the corresponding one of the first valve seat or the auxiliary seat surface by the biasing member. Thus, it is possible to ensure sealing at both the first valve body and the auxiliary seat portion. Consequently, it is possible to reduce the leakage of a fluid in the valve.

Advantageous Effects

According to at least one embodiment of the present invention, there is provided a valve and a steam turbine facility whereby it is possible to reduce the leakage of a fluid.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

The following example will be described in conjunction with a case where a valve according to some embodiments is used as a steam valve of a steam turbine facility. However, the valve according to some embodiments may be used for anything other than the steam turbine facility, for instance, may be used for controlling a fluid other than steam.

Figure 1:
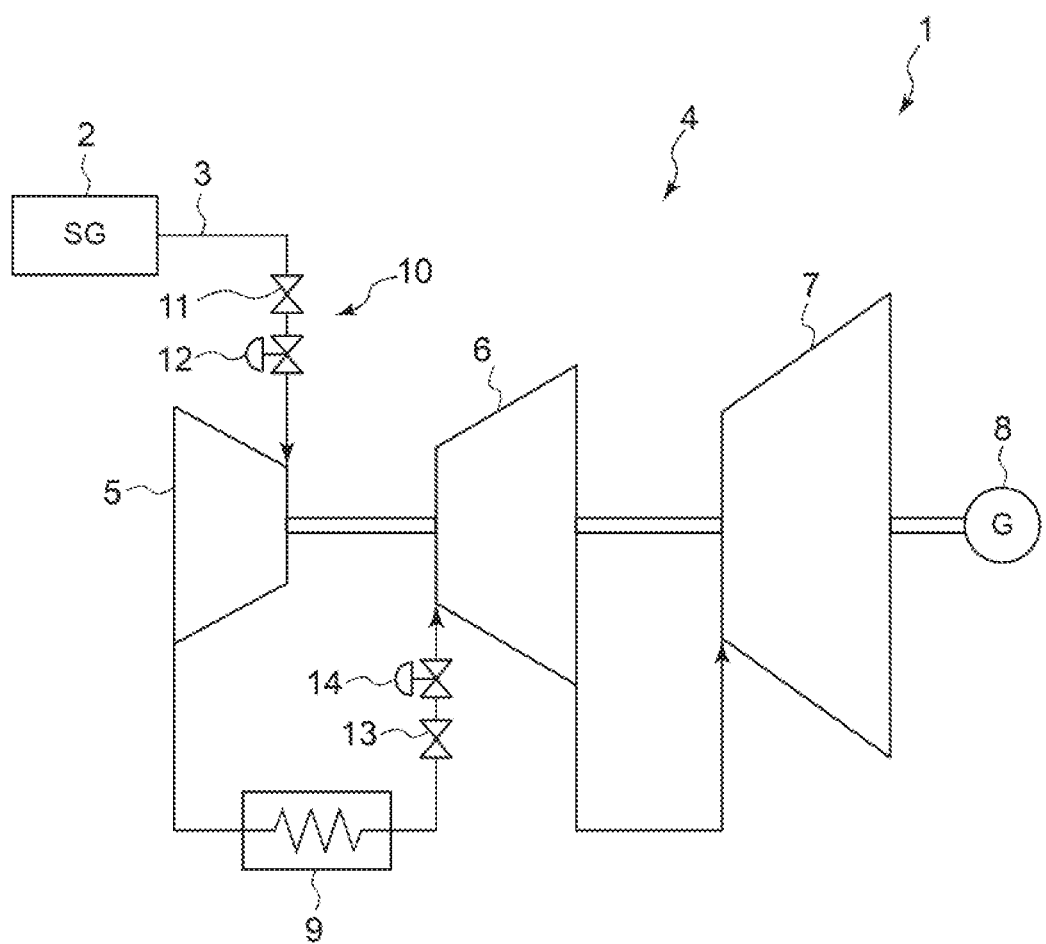
FIG. 1 is a schematic configuration diagram of a steam turbine facility using a valve according to an embodiment.

First, a steam turbine facility using a valve according to an embodiment will be described. FIG. 1 is a schematic configuration diagram of the steam turbine facility using the valve according to an embodiment.

As shown in FIG. 1, the steam turbine facility 1 includes a boiler 2 for generating steam, a steam turbine 4 converting the pressure of the steam from the boiler 2 to rotational energy, and a generator 8 driven by rotation of the steam turbine 4.

In the embodiment shown in FIG. 1, the steam turbine 4 includes a high-pressure steam turbine 5, an intermediate-pressure steam turbine 6, and a low-pressure steam turbine 7, and a re-heater 9 is disposed between the high-pressure steam turbine 5 and the intermediate-pressure steam turbine 6. The steam discharged from the high-pressure steam turbine 5 is re-heated by the re-heater 9 and is supplied to the intermediate-pressure steam turbine 6. Further, the steam discharged from the intermediate-pressure steam turbine 6 is supplied to the low-pressure steam turbine 7.

The boiler 2 and the high-pressure steam turbine 5 are connected with a main steam supply pipe 3. The main steam supply pipe 3 is provided with a steam valve 10 including a stop valve 11 and a control valve 12. The flow of the steam supplied to the high-pressure steam turbine 5 from the boiler 2 can be stopped by closing the stop valve 11. Further, the flow rate of the steam supplied to the high-pressure steam turbine 5 horn the boiler 2 can be controlled by adjusting the opening degree of the control valve 12.

A pipe connecting the re-heater 9 and the intermediate-pressure steam turbine 6 is provided with a stop valve 13 and a control valve 14. The stop valve 13 and the control valve 14 can stop the flow of the steam supplied to the intermediate-pressure steam turbine 6 or control the flow rate of the steam.

In some embodiments, the stop valve 11 is a valve 20 described below. In some embodiments, the stop valve 13, the control valve 12, or the control valve 14 may be the valve 20 described below.

Next, with reference to FIGS. 2 and 6, the valve 20 according to some embodiments will be described.

Figure 2:
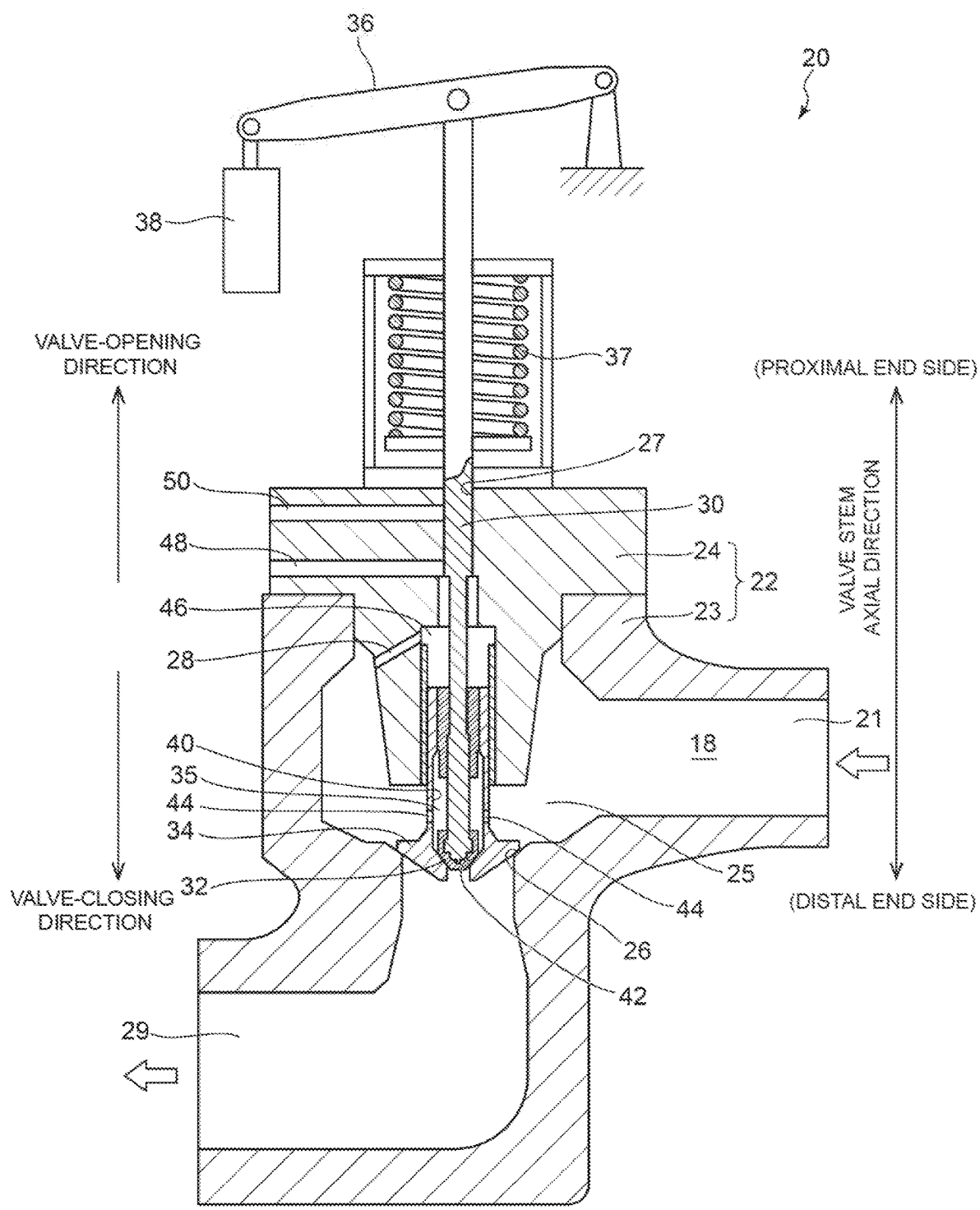
FIG. 2 is a schematic configuration diagram of an entire valve according to some embodiments.

FIG. 2 is a schematic configuration diagram of the entire valve according to some embodiments. As shown in FIG. 2, the valve 20 according to some embodiment is a primary/secondary valve including a valve stem 30, a first valve body (secondary valve) 32 disposed on a distal end side of the valve stem 30, a second valve body (primary valve) 34 having an inner space 35 receiving the first valve body 32, and a valve casing 22 housing the first valve body 32 and the second valve body 34.

The inner space 35 of the second valve body 34 is defined by an inner wall surface 40 of the second valve body 34. The inner wall surface 40 forms a first valve seat (secondary valve seat) 42 on which the first valve body 32 can be seated.

The valve casing 22 includes a casing body 23 and a bonnet 24 attached to the casing body 23. The casing body 23 and the bonnet 24 together form a steam flow path 18 connecting a steam inlet 21 to a steam outlet 29 and a housing space 25 housing the first valve body 32 and the second valve body 34.

The casing body 23 has a second valve seat (primary valve seat) 26 on which the second valve body 34 can be seated. The bonnet 24 has a through hole 27. The valve stem 30 is inserted into the through hole 27.

The second valve body has a channel 44 connecting the inner space 35 of the second valve body 34 to the steam flow path 18 on the steam inlet 21 side.

The bonnet 24 has a balance hole 28 connecting a back-surface-side space 46 of the second valve body 34 to the steam flow path 18 on the steam inlet 21 side.

The bonnet 24 has a first collection line 48 and a second collection line 50 to collect a fluid which leaks from the valve body (first valve body 32 and second valve body 34) toward the atmosphere through a gap between the through hole 27 and the valve stem 30. The second collection line 50 is further away from the first valve body 32 than the first collection line 48 and is connected to a fluid reservoir (not shown) having a lower pressure than that of the first collection line 48.

The valve stem 30 is connected to an actuator 38 (e.g., hydraulic actuator) via a lever 36. The valve 20 includes a spring 37 for imparting a biasing force in the valve-closing direction to the first valve body 32 via the valve stem 30.

The first valve body 32 and the second valve body 34 are driven via the valve stem 30.

When the valve 20 is in a closed state, the first valve body 32 and the second valve body 34 are being biased toward the first valve seat 42 and the second valve seat 26 (in the valve-closing direction) by the spring 37.

To open the valve 20, the actuator 38 is operated (for instance, by supplying oil to a hydraulic chamber in case of a hydraulic actuator) so that a driving force in an opposite direction to the biasing force of the spring 37 is applied to the valve stem 30 via the lever 36. Once the driving force applied to the valve stem 30 by the actuator 38 exceeds the biasing force of the spring 37, first, the first valve body 32 moves together with the valve stem 30 in the valve-opening direction so that the first valve body 32 moves away from the first valve seat 42. At this time, the second valve body 34 still rests on the second valve seat 26. Thereafter, a valve-stem-side contact surface 72 (see FIG. 3) of the valve stem 30 and a primary-valve-side contact surface 74 (see FIG. 3) of the second valve body 34 which face each other in the valve opening/closing direction are brought into contact, and the second valve body 34 moves together with the first valve body 32 in the valve-opening direction so that the second valve body 34 moves away from the second valve seat 26. In this way the valve 20 becomes in an open state (see FIG. 5).

When the valve 20 is thus opened, if the first valve body 32 moves away from the first valve seat 42 in the valve-opening direction while the second valve body 34 rests on the second valve seat 26, the steam flow path 18 communicates with the back-surface-side space 46 of the second valve body 34 via the channel 44 disposed in the second valve body 34 and the balance hole 28 provided in the bonnet 24. This reduces a difference in pressure between front and back of the second valve body 34, thus enabling the second valve body 34 to be opened without applying a large driving force to the actuator 38 or the like.

Conversely, to close the valve 20, the actuator 38 is operated (for instance, by discharging oil from a hydraulic chamber in case of a hydraulic actuator) so as to reduce a driving force applied in the valve-opening direction to the valve stem by the actuator 38 via the lever 36. Then, the first valve body 32 and the second valve body 34 move toward the first valve seat 42 and the second valve seat 26 by the biasing force of the spring 37 or the like and are seated thereon. In this way, the valve 20 becomes in a closed state.

Figure 3:
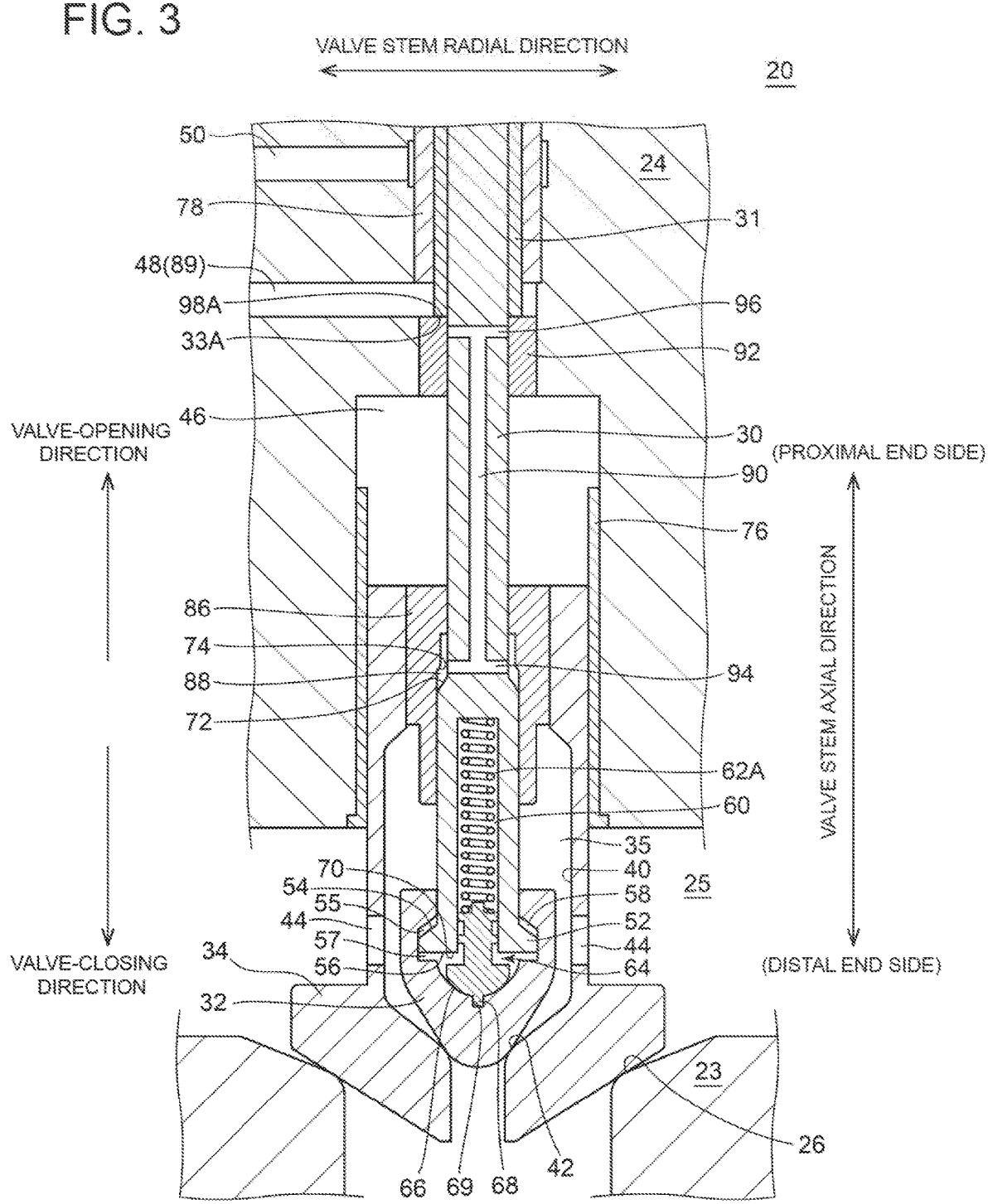
FIG. 3 is a configuration diagram of a main part of a valve according to an embodiment.
Figure 4:
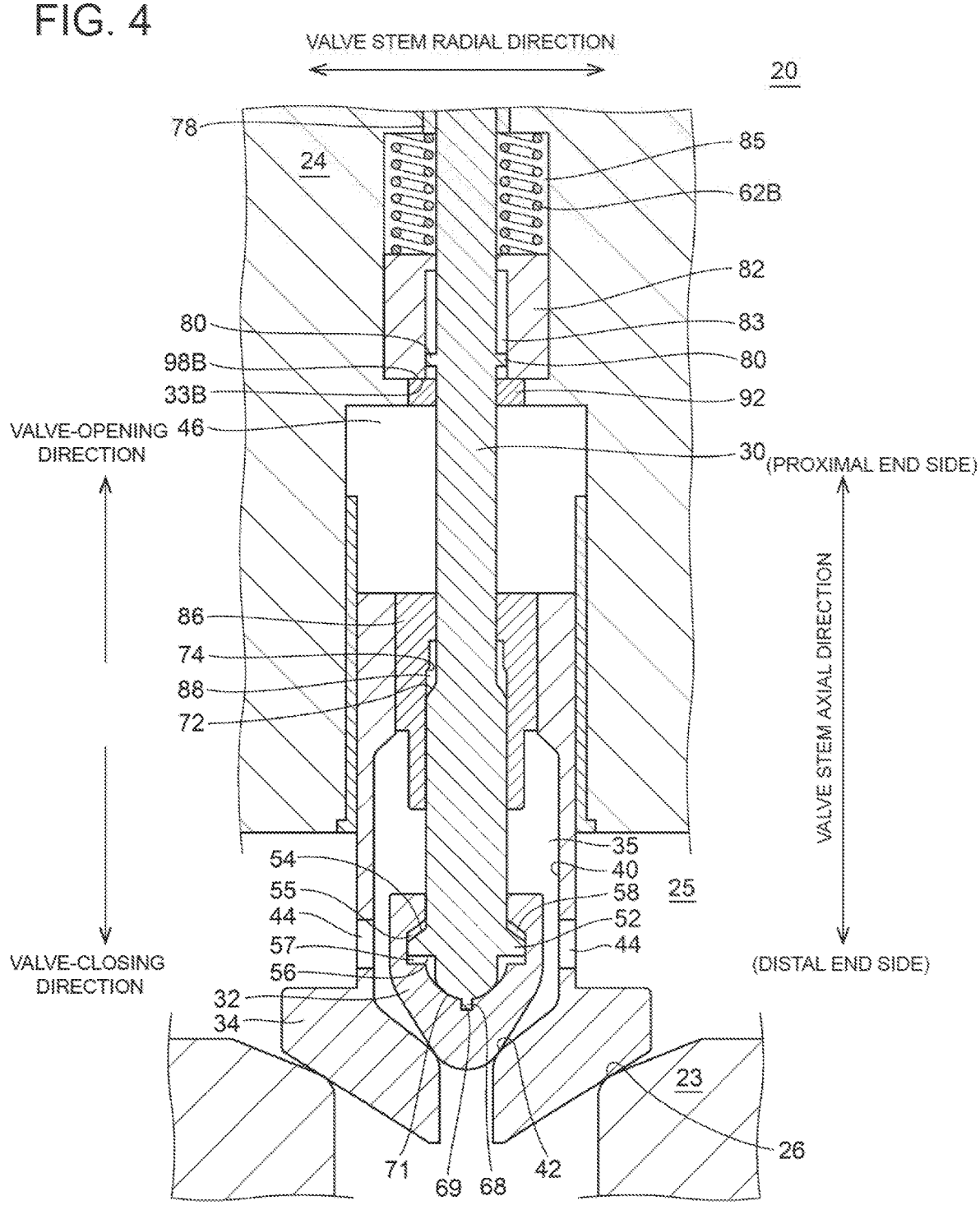
FIG. 4 is a configuration diagram of a main part of a valve according to an embodiment.
Figure 5:
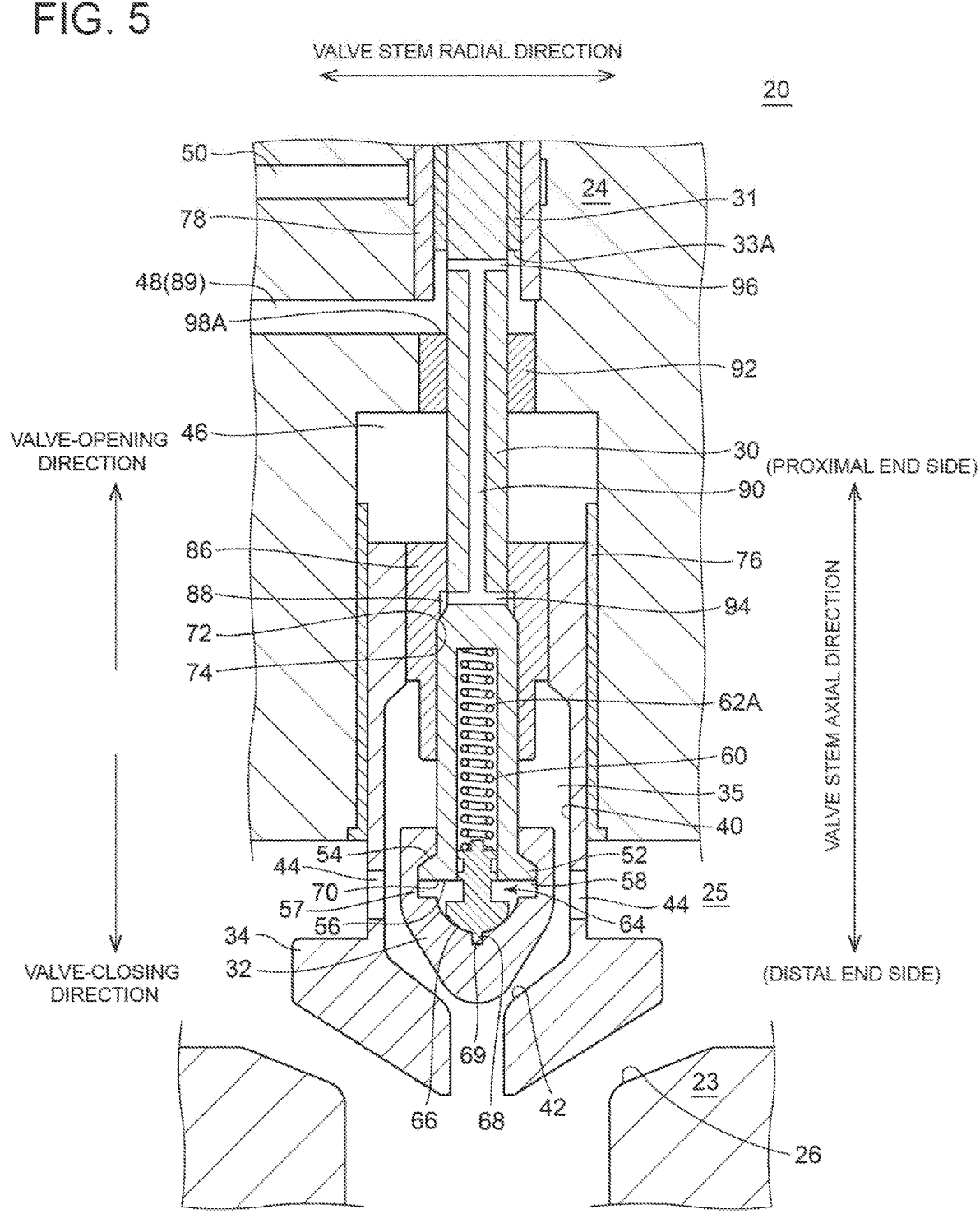
FIG. 5 is a diagram showing a valve depicted in FIG. 3 which is fully open.

FIGS. 3 and 4 are each a configuration diagram of a main part of the valve according to an embodiment. FIGS. 3 and 4 show the valve which is fully closed (i.e., both the first valve body 32 and the second valve body 34 are in closed positions). FIG. 5 is a diagram showing the valve depicted in FIG. 3 which is fully open (i.e., both the first valve body 32 and the second valve body 34 are in open positions). FIG.

6 is a diagram showing the valve depicted in FIG. 3 which moves from an open position to a closed position.

In FIGS. 3 to 6, the balance hole is not illustrated for clarity. In addition, in FIG. 4, the first collection line 48 and the second collection line 50 are not illustrated for clarity.

In the embodiments shown in FIGS. 3 and 4, the second valve body 34 includes a first bush 86, positioned on a radially outer side of the valve stem 30, for guiding the valve stem 30 in the axial direction of the valve stem 30. In the examples shown in FIGS. 3 and 4, the first bush 86 is separated from the second wave body 34 and is attached to the second valve body. In an embodiment, the first bush 86 may be formed integrally with the second valve body 34.

Additionally, the bonnet 24 (valve casing 22) includes a second bush 92, located on a radially outer side of the valve stem 30, for guiding the valve stem 30 in the axial direction of the valve stem 30.

Additionally, the bonnet 24 includes a sleeve 76 located on a radially outer side of the second valve body 34 for guiding the second valve body 34 to slide in the axial direction (valve opening/closing direction) and a sleeve 78 located on a radially outer side of the valve stem 30 for guiding the valve stem 30 in the axial direction of the valve stem 30.

In some embodiments, the valve 20 includes an auxiliary seat surface 98A, 98B extending along a direction transverse to the axial direction of the valve stem 30, an auxiliary seat portion 33A, 33B disposed on a proximal end side opposite to the distal end side on which the first valve body 32 is disposed, and a biasing member capable of generating a biasing force along the axial direction of the valve stem 30. The auxiliary seat portion 33A, 33B is configured to abut on the auxiliary seat surface 98A, 98B when the first valve body 32 is open. Further, one of the first valve body 32 or the auxiliary seat portion 33A, 33B is displaceable in the axial direction of the valve stem 30 relative to the valve stem 30 and is biased toward a corresponding one of the first valve seat 42 or the auxiliary seat surface 98A, 33B by the biasing member.

For instance, in the illustrative embodiment shown in FIG. 3, a proximal end surface of the second bush 92 directed to the proximal end of the valve stem 30 forms the auxiliary seat surface 98A, and a distal end surface of an enlarged-diameter part 31, which is provided on a radially outer side of the valve stem 30 so as to move in conjunction with the valve stem 30, forms the auxiliary seat portion 33A.

Additionally, a spring 62A is disposed as the biasing member between the first valve body 32 and the valve stem 30. On the distal end side of the valve stem 30, a valve stem hole 60 extending in the axial direction of the valve stem 30 and opening to a distal end surface 70 of the valve stem 30 is provided. The spring 62A is provided within the valve stem hole 60.

The first valve body 32 is displaceable in the axial direction of the valve stem 30 relative to the valve stem 30 and is biased toward the first valve seat 42 by the spring 62A provided between the first valve body 32 and the valve stem 30.

The enlarged-diameter part 31 may be formed integrally with the valve stem 30. Alternatively, the enlarged-diameter part 31 may be separated from the valve stem 30 and may be attached on a radially outer side of the valve stem 30.

In the embodiment shown in FIG. 3, the first valve body 32 is displaceable in the axial direction of the valve stem 30 relative to the valve stem 30, and is biased toward the first valve seat 42 by the spring 62A. Thereby, when the first valve body 32 is closed, the auxiliary seat portion 33A abuts on the auxiliary seat surface 98A, and the first valve body 32 is pressed to the first valve seat 42 by the spring 62A. Thus, it is possible to ensure sealing at both the first valve body 32 and the auxiliary seat portion 33A, and it is possible to reduce the leakage of a fluid toward the atmosphere through a gap between the through hole 27 and the valve stem 30.

Additionally, for instance, in the illustrative embodiment shown in FIG. 4, the bonnet 24 (valve casing 22) has an axial hole 85 disposed on the proximal end side of the valve stem 30 with respect to the second bush 92 so as to extend in the axial direction. The axial hole 85 contains a movable segment 82 which can move along the axial direction of the valve stem 30 within the axial hole 85. On a radially inner side of the movable segment 82, a recess 83 extending along the axial direction is provided. The valve stem 30 has a projection 80 projecting in the radial direction of the valve stem 30 toward the recess 83. The projection 80 engages with the recess 83 so as to be slidable with respect to the movable segment 82 in the axial direction. Since the projection 80 is slidable with respect to the movable segment 82 in the axial direction, when the first valve body 32 and the second valve body 34 move in the valve opening direction, the projection 80 pushes the movable segment 82 in the axial direction and contracts the spring 62B, thus releasing the seat at the auxiliary seat portion 33B.

In the embodiment shown in FIG. 4, the proximal end surface of the second bush 92 directed to the proximal end of the valve stem 30 forms the auxiliary seat surface 98B, and a distal end surface of the movable segment 82 directed to the distal end of the valve stem 30 forms the auxiliary seat portion 33B.

Additionally, a spring 62B is disposed as the biasing member within the axial hole 85 on the proximal end side of the valve stem 30 with respect to the movable segment 82.

Further, the auxiliary seat portion 33B is displaceable in the axial direction of the valve stem 30 relative to the valve stem 30 and is biased toward the auxiliary seat surface 98B by the spring 62B.

In the embodiment shown in FIG. 4, the auxiliary seat portion 33B is displaceable in the axial direction of the valve stem 30 relative to the valve stem 30, and is biased toward the auxiliary seat surface 98B by the spring 62B. Thereby, when the first valve body 32 is closed, the first valve body 32 is seated on the first valve seat 42, and the auxiliary seat portion 33B is pressed to the auxiliary seat surface 98B by the spring 62B. Thus, it is possible to ensure sealing at both the first valve body 32 and the auxiliary seat portion 33B, and it is possible to reduce the leakage of a fluid toward the atmosphere through a gap between the through hole 27 and the valve stem 30 in the valve 20.

In some embodiments, the valve stem 30 has a valve-stem-side engagement portion including a projection or a recess projecting or recessed in the radial direction of the valve stem 30 on the distal end side of the valve stem 30, and the first valve body 32 has a valve-body-side engagement portion including a recess or a projection recessed or projecting in the radial direction so as to engage with the valve-stem-side engagement portion. The valve-stem-side engagement portion is loosely fitted to the valve-body-side engagement portion so that the first valve body 32 is displaceable in the axial direction of the valve stem 30 relative to the valve stem 30.

For instance, in the embodiment shown in FIG. 3, the valve stem 30 has a projection 52 (valve-stem-side engagement portion) projecting in the radial direction of the valve stem 30 on the distal end side of the valve stem 30, and the first valve body 32 has a recess 58 (valve-body-side engagement portion) recessed in the radial direction of the valve stem 30 so as to engage with the projection 52. The projection 52 (valve-stem-side engagement portion) is loosely lifted to the recess 58 (valve-body-side engagement portion) so that the first valve body 32 is displaceable in the axial direction relative to the valve stem 30.

More specifically, in the embodiment shown in FIG. 3, the projection 52 (valve-stem-side engagement portion) has a first surface 54 directed to the valve opening side (valve opening direction) in the axial direction of the valve stem 30 and facing the first valve body 32 and a second surface 56 directed to the valve closing side (valve closing direction) in the axial direction of the valve stem 30 and facing the first valve body 32. Further, a gap (55 or 57) is provided in at least one of a portion between the first surface 54 and the first valve body 32 or a portion between the second surface 56 and the first valve body 32.

In this way, the projection 52 (valve-stem-side engagement portion) is loosely fitted to the recess 58 (valve-body-side engagement portion), and a gap is formed between the projection 52 (valve-stem-side engagement portion) and the recess 58 (valve-body-side engagement portion) in the axial direction of the valve stem 30. This gap enables the first valve body 32 to be displaced relative to the valve stem 30 in the axial direction. Thereby, it is possible to appropriately press the first valve body 32 to the first valve seat 42 by the biasing force of the spring 62A serving as the biasing member, and it is possible to ensure sealing at both the first valve body 32 and the auxiliary seat portion 33A.

In the embodiment shown in FIG. 3, when the first valve body 32 rests on the first valve seat 42 (i.e., when the valve 20 is in a state shown in FIG. 3), a first gap 55 is formed between the first surface 54 and the first valve body 32, and a second gap 57 is formed between the second surface 56 and the first valve body 32.

In this case, when the first valve body is closed, the first gap 55 is formed between the first valve body 32 and the first surface 54 directed to the valve-opening side of the projection (valve-stem-side engagement portion), and the second gap 57 is formed between the first valve body 32 and the second surface 56 directed to the valve closing side of the projection (valve-stem-side engagement portion).

The first gap 55 formed on the valve-opening side of the projection (valve-stem-side engagement portion) when the first valve body 32 is closed prevents the first valve body 32 from being lifted by the valve stem 30 when the valve stem 30 is contracted due to a reduction in temperature of the valve stem in response to the stop of the flow of a fluid (e.g., steam) into the valve 20.

On the other hand, the second gap 57 formed on the valve-closing side of the projection (valve-stem-side engagement portion) when the first valve body 32 is closed enables both the first valve body 32 and the auxiliary seat portion 33A to be sealed well even if the first valve body 32 and the auxiliary seat portion 33A cannot be simultaneously seated. Further, the second gap 57 can absorb thermal expansion difference between various components including the valve stem 30 and the first valve body 32.

As described above, in the embodiment shown in FIG. 3, the spring 62A as the biasing member is disposed within the valve stem hole 60 extending in the axial direction of the valve stem 30 and opening to the distal end surface 70 of the valve stem 30.

In this case, the spring 62A guided by the valve stem hole 60 extending in the axial direction of the valve stem 30 can impart a biasing force in the axial direction to the first valve body 32. Thereby, it is possible to appropriately press the first valve body 32 to the first valve seat 42 by the spring 62A, and it is possible to ensure sealing at both the first valve body 32 and the auxiliary seat portion 33A.

In the embodiment shown in FIG. 3, the valve 20 further includes a biasing-force receiving portion 64 positioned between the first valve body 32 and the spring 62A to transmit the biasing force of the spring 62A to the first valve body 32. The biasing-force receiving portion 64 engages with the valve stem hole 60 and is guided by the valve stem hole 60 in the axial direction of the valve stem 30.

Thus, the biasing force along the axial direction is imparted to the first valve body 32 via the biasing-force receiving portion 64 configured to be guided by the valve stem hole 60 in the axial direction, whereby it is possible to more appropriately press the first valve body 32 to the first valve seat 47.

Additionally, the biasing-force receiving portion 64 at least partially has a spherical portion 66 adjacent to the first valve body 32, and the spherical portion 66 is configured to come into contact with the first valve body 32.

In this case, it is possible to reduce stress concentration, compared with a case where a corner portion comes into contact with the first valve body 32, and it is possible to improve the lifetime of the biasing-force receiving portion 64 or the first valve body 32.

Additionally, the biasing-force receiving portion 64 has a protrusion 68 engaged with a groove 69 formed in the first valve body 32 so as to be recessed in the axial direction of the valve stem 30. Typically, the groove 69 and the protrusion 68 are provided so as to pass through the central axis of the valve stem 30.

With the protrusion 68 engaged with the groove 69 formed in the first valve body 32 so as to be recessed in the axial direction of the valve stem 30, the biasing-force receiving portion 64 can be reliably centered at the central axis of the valve stem 30. Thereby, the biasing force along the axial direction can be reliably imparted to the first valve body 32, and the first valve body 32 can be more reliably pressed to the first valve seat 42. Thus, it is possible to ensure sealing of the valve 20 at both the first valve body 32 and the auxiliary seat portion 33A.

In some embodiments, the valve is configured so that, when the second valve body 34 is in an open position away from the second valve seat 26, one of the valve stem 30 or the first valve body 32 is biased in the valve-opening direction of the first valve body 32, with respect to the second valve body 34.

Herein, a state that the valve body is "in an open position" may mean that the valve body is situated at an optional position away from the valve seat or may mean that the valve body is situated at a specific position away from the valve seat. That is, the state that the valve body is "in an open position" means that the valve seat is situated at least at one of positions away from the valve seat.

In the embodiment shown in FIG. 3, a first chamber 88 formed between the valve stem 30 and the first bush 86 disposed on the second valve body 34 is configured to have a lower pressure than a pressure of the inner space 35 of the second valve body 34 receiving the first valve body 32 when the second valve body 34 is in the open position (see FIG. 5).

More specifically, the valve stem 30 has a communication channel 90 extending in the axial direction within the valve stem 30, and when the second valve body 34 is in the open position (see FIG. 5), the first chamber 88 communicates with a second chamber 89 having a lower pressure than the first chamber 88 via the communication channel 90.

In the illustrative embodiment shown in FIG. 3, the second chamber 89 is formed by the first collection line 48 for collecting a fluid leaking through a gap between the valve stem 30 and the second bush 92 disposed on the valve casing 22.

Additionally, in the embodiment shown in FIG. 3, the valve stem 30 includes a pair of communication holes (94, 96) extending in the radial direction of the valve stem 30 and connected to opposite ends of the communication channel 90 respectively. The pair of communication holes include a first communication hole 94 positioned on the first valve body 32 side and a second communication hole 96 positioned on an opposite side (adjacent to the proximal end of the valve stem 30) to the first valve body 32.

When the second valve body 34 is in the open position (see FIG. 5), the first communication hole 94 of the pair of communication holes (94, 96), positioned on the first valve body 32 side, communicates with the first chamber 88, and the second communication hole 96 of the pair of communication holes (94, 96) communicates with the second chamber 89 (first collection line 48 in the example shown in FIG. 3).

An exemplary procedure for closing the valve 20 with the above configuration will be described with reference to FIGS. 3, 5, and 6.

First, as shown in FIG. 5, when the second valve body 34 is in the open position away from the second valve seat 26, the first communication hole 94 of the communication channel 90 disposed within the valve stem 30 communicates with the first chamber 88, and the second communication hole 96 communicates with the first collection line 48 which is the second chamber 89.

Thus, the first chamber 88 formed on the back surface side of the first valve body 32 is connected to the first collection line 48, which is the second chamber 89 having a lower pressure than the inner space 35, via the communication channel 90, and the pressure of the first chamber 88 becomes lower than the pressure of the inner space 35 of the second valve body 34. Consequently, a biasing force in the valve-opening direction of the first valve body 32 acts on the valve stem 30 on the basis of the difference in pressure between the first chamber 88 and the inner space 35 of the second valve body 34. The first communication hole 94 opens to the valve stem 30 on the valve-opening side of the valve-stem-side contact surface 72 and communicates with the first chamber 88.

When the actuator 38 (see FIG. 2) is operated (for instance, by discharging oil from a hydraulic chamber in case of a hydraulic actuator) in this state, the valve stem 30 is moved in the valve-closing direction of the first valve body 32. At this time, as described above, since the second valve body 34 is in the open position, the first valve body 32 is biased in the valve-opening direction with respect to the second valve body 34. Thus, when the second valve body 34 moves from the open position (see FIG. 5) to the closed position (see FIG. 5), the first valve body 32 moves together with the second valve body 34 in the valve-closing direction of the second valve body 34 while the first valve body 32 is kept on the valve-opening side of the first valve body 32 in the inner space 35 of the second valve body 34 (process of transition from a state of FIG. 5 to a state of FIG. 6).

Figure 6:
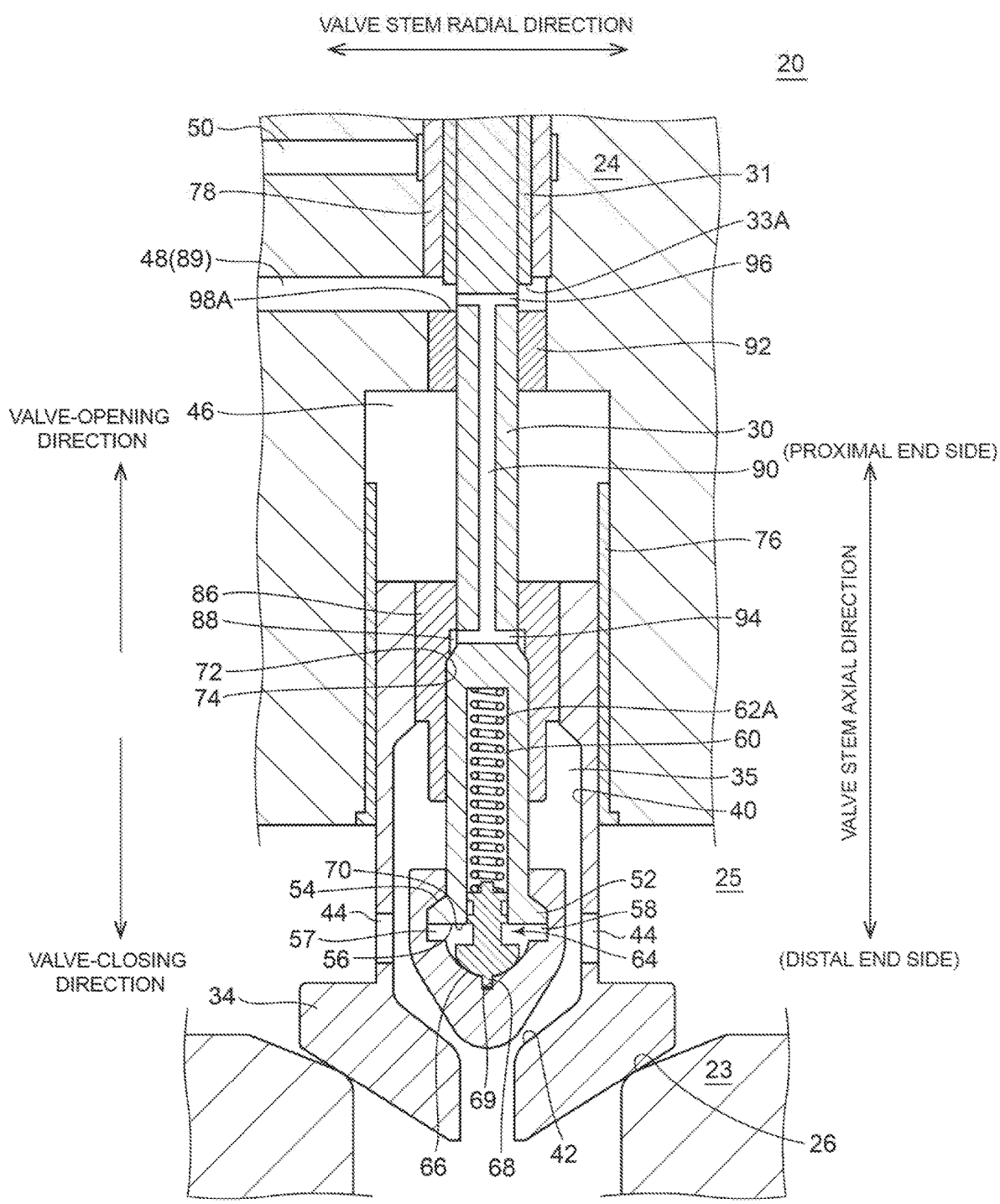
FIG. 6 is a diagram showing a valve depicted in FIG. 3 which moves from an open position to a closed position.

Then, after the second valve body 34 is seated on the second valve seat 26 as shown in FIG. 6, the valve stem 30 further moves in the valve-closing direction, and the first valve body 32 is seated on the first valve seat 42 (a state shown in FIG. 3).

Thus, since the second valve body 34 and the first valve body 32 are seated stepwise when the valve is closed, the mass of the valve body that collides with the valve seat is reduced, compared with a case where the second valve body 34 and the first valve body 32 are collectively seated for instance, a case where the second valve body 34 is seated on the second valve seat 26 while the first valve body 32 is seated on the second valve body 34). This reduces an impact force generated on the valve body and the valve seat by collision between the valve body and the valve seat. Thus, it is possible to reduce damage of the seat portion.

In the embodiment shown in FIG. 3, the first chamber 88 is a lift gap allowing the valve stem 30 and the first valve body 32 to be lifted with respect to the second valve body 34. A part of the lift gap is defined by the valve-stem-side contact surface 72 of the valve stem 30 and the first bush 86.

Thus, using the lift gap for lifting the valve stem 30 and the first valve body 32 with respect to the second valve body 34, it is possible to form the first chamber 88 having a lower pressure than the inner space of the second valve body 34.

As shown in FIG. 3, when the second valve body 34 is in the closed position, the first chamber 88 does not communicate with the first collection line 48 which is the second chamber 89. That is, the communication channel 90 is separated from the first collection line 48 which is the second chamber 89 by an abutting portion where the auxiliary seat portion 33A abuts on the auxiliary seat surface 98A.

Thus, since the first chamber 88 does not communicate with the first collection line 48 which is the second chamber 89 when the second valve body is in the closed position, a leaking flow of a fluid from the first chamber 88 to the first collection line 48, which is the second chamber 89, is shut off. Thereby, it is possible to reduce the leakage of the fluid from the inner space 35 of the second valve body 34 through a gap between the valve stem 30 and the first bush 86.

As described above, in the embodiment shown in FIG. 3, the second collection line 50 is disposed in the valve casing 22 at a position further away from the first valve body 32 than the first collection line 48 is, and the second collection line 50 is connected to a fluid reservoir (not shown) having a lower pressure than that of the first collection line 48.

When the valve 20 includes the second collection line 50 in addition to the first collection line 48, it is possible to collect a leaking fluid with the second collection line 50 without releasing the leaking fluid to the atmosphere even if all of the leaking fluid through a gap between the second bush 92 and the valve stem 30 cannot be collected with the first collection line 48.

In some embodiments, when the valve is fully closed (i.e., when both the first valve body 32 and the second valve body 34 are in closed positions), once the valve stem 30 is moved in the valve-opening direction, the first chamber 88 communicates with the second chamber 89 having a lower pressure than the first chamber 88 via the communication channel 90, and the pressure of the first chamber 88 becomes lower than the pressure of the inner space 35 of the second valve body 34.

This facilitates a flow of a leaking fluid from the inner space 35 into a gap between the first bush 86 and the valve stem 30, improving sliding performance between the first bush 86 and the valve stem 30. Thus, it is possible to move the valve stem 30 by a relatively small driving force.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Steam turbine facility
2 Boiler
3 Main steam supply pipe
4 Steam turbine
5 High-pressure steam turbine
6 Intermediate-pressure steam turbine
7 Low-pressure steam turbine
8 Generator
9 Re-heater
10 Steam valve
11 Stop valve
12 Control valve
13 Stop valve
14 Control valve
18 Steam flow path
20 Valve
21 Steam inlet
22 Valve casing
23 Casing body
24 Bonnet
25 Housing space
26 Second valve seat
27 Through hole
28 Balance hole
29 Steam outlet
30 Valve stem
31 Enlarged-diameter part
32 First valve body
33A, 33B Auxiliary seat portion
34 Second valve body
35 Inner space
36 Lever
37 Spring
38 Actuator
40 Inner wall surface
42 First valve seat
44 Channel
46 Back-surface-side space
48 First collection line
50 Second collection line
52 Projection
54 First surface
55 First gap
56 Second surface
57 Second gap
58 Recess
60 Valve stem hole
62A, 62B Spring
64 Biasing-force receiving portion
66 Spherical portion
68 Protrusion
69 Groove
70 Distal end surface
72 Valve-stem-side contact surface
74 Primary-valve-side contact surface
76 Sleeve
78 Sleeve
80 Projection
82 Movable segment
83 Recess
85 Axial hole
86 First bush
88 First chamber
90 Communication channel
92 Second bush
94 First communication bole
96 Second communication hole
98A, 98B Auxiliary seat surface

The invention claimed is:

1. A steam valve comprising:
a valve stem;
a first valve body disposed on a distal end side of the valve stem and configured to be driven via the valve stem;
a first valve seat on which the first valve body is seatable;
an auxiliary seat surface extending along a direction transverse to an axial direction of the valve stem and directed to a valve-opening direction in the axial direction of the valve stem;
an auxiliary seat portion disposed on a proximal end side of the valve stem with respect to the first valve body and directed to a valve-closing direction in the axial direction, the auxiliary seat portion being movable along the axial direction and configured to abut on the auxiliary seat surface when the first valve body is closed; and
a biasing member capable of generating a biasing force along the axial direction of the valve stem,
wherein one of the first valve body or the auxiliary seat portion is displaceable in the axial direction relative to the valve stem and is biased toward a corresponding one of the first valve seat or the auxiliary seat surface by the biasing member.

2. The steam valve according to claim 1,
wherein the valve stem is displaceable, with a deformation of the biasing member, in the axial direction relative to the first valve body when the first valve body abuts on the first valve seat.

3. The steam valve according to claim 2,
wherein the valve stem has a valve-stem-side engagement portion including a projection or a recess projecting or recessed in a radial direction of the valve stem on the distal end side,
wherein the first valve body has a valve-body-side engagement portion including a recess or a projection recessed or projecting in the radial direction so as to engage with the valve-stem-side engagement portion, and
wherein the valve-stem-side engagement portion is loosely fitted to the valve-body-side engagement portion so that the first valve body is displaceable in the axial direction relative to the valve stem.

4. The steam valve according to claim 3,
wherein the valve stem has the projection projecting outward in the radial direction as the valve-stem-side engagement portion,
wherein the projection serving as the valve-stem-side engagement portion has:
　a first surface directed to a valve-opening side in the axial direction of the valve stem and facing the first valve body; and
　a second surface directed to a valve-closing side in the axial direction of the valve stem and facing the first valve body, and
wherein a gap is provided in at least one of a portion between the first surface and the first valve body or a portion between the second surface and the first valve body.

5. The steam valve according to claim 2,
wherein the valve stem has a valve stem hole extending in the axial direction on the distal end side and opening to a distal end surface of the valve stem, and
wherein the biasing member is a spring disposed within the valve stem hole.

6. The steam valve according to claim 5, further comprising a biasing-force receiving portion disposed between the first valve body and the biasing member to transmit the biasing force to the first valve body, the biasing-force receiving portion engaging with the valve stem hole and configured to be guided by the valve stem hole in the axial direction.

7. The steam valve according to claim 5,
wherein the biasing-force receiving portion at least partially has a spherical portion adjacent to the first valve body, and the spherical portion is configured to come into contact with the first valve body.

8. The steam valve according to claim 5,
wherein the biasing-force receiving portion has a protrusion engaged with a groove formed in the first valve body so as to be recessed toward the axial direction of the valve stem.

9. The steam valve according to claim 1, further comprising:
　a second valve body having an inner wall surface forming the first valve seat and an inner space defined by the inner wall surface, the inner space receiving the first valve body; and
　a valve casing having a second valve seat on which the second valve body is seatable,
wherein, when the second valve body is in an open position away from the second valve seat, one of the valve stem or the first valve body is biased in a valve-opening direction of the first valve body with respect to the second valve body.

10. The steam valve according to claim 9,
wherein the second valve body includes a first bush, positioned on a radially outer side of the valve stem, for guiding the valve stem in the axial direction of the valve stem, and
wherein, when the second valve body is in the open position, a first chamber formed between the first bush and the valve stem has a lower pressure than a pressure of the inner space of the second valve body receiving the first valve body.

11. The steam valve according to claim 10,
wherein the first chamber is a lift gap allowing the valve stem and the first valve body to be lifted with respect to the second valve body.

12. The steam valve, comprising:
　a valve stem;
　a first valve body disposed on a distal end side of the valve stem and configured to be driven via the valve stem;
　a first valve seat on which the first valve body is seatable;
　an auxiliary seat surface extending along a direction transverse to an axial direction of the valve stem;
　an auxiliary seat portion disposed on a proximal end side of the valve stem with respect to the first valve body and configured to abut on the auxiliary seat surface when the first valve body is closed; and
　a biasing member capable of generating a biasing force along the axial direction of the valve stem,
wherein one of the first valve body or the auxiliary seat portion is displaceable in the axial direction relative to the valve stem and is biased toward a corresponding one of the first valve seat or the auxiliary seat surface by the biasing member,
the steam valve according further comprising:
　a second valve body having an inner wall surface forming the first valve seat and an inner space defined by the inner wall surface, the inner space receiving the first valve body; and
　a valve casing having a second valve seat on which the second valve body is seatable,
wherein, when the second valve body is in an open position away from the second valve seat, one of the valve stem or the first valve body is biased in a valve-opening direction of the first valve body with respect to the second valve body,
wherein the second valve body includes a first bush, positioned on a radially outer side of the valve stem, for guiding the valve stem in the axial direction of the valve stem,
wherein, when the second valve body is in the open position, a first chamber formed between the first bush and the valve stem has a lower pressure than a pressure of the inner space of the second valve body receiving the first valve body, and
wherein the valve stem has a communication channel extending in the axial direction within the valve stem, wherein the steam valve is configured so that when the second valve body is in the open position, the first chamber communicates with a second chamber via the communication channel, the second chamber having a lower pressure than that of the first chamber, and
when the second valve body is in a closed position, the first chamber does not communicate with the second chamber.

13. The steam valve according to claim 12,
wherein the valve casing has the auxiliary seat surface extending along the direction transverse to the axial direction of the valve stem,
wherein the valve stem includes the auxiliary seat portion abuttable on the auxiliary seat surface when the second valve body is in the closed position, and
wherein, when the second valve body is in the closed position, the communication channel is separated from the second chamber by an abutting portion between the auxiliary seat portion and the auxiliary seat surface.

14. A steam turbine facility comprising: a steam valve according to claim 1; and
a steam turbine disposed downstream of the steam valve.

15. A valve comprising:
a valve stem;
a first valve body disposed on a distal end side of the valve stem and configured to be driven via the valve stem;
a first valve seat on which the first valve body is seatable;
an auxiliary seat surface extending along a direction transverse to an axial direction of the valve stem;
an auxiliary seat portion disposed on a proximal end side of the valve stem with respect to the first valve body and configured to abut on the auxiliary seat surface when the first valve body is closed; and
a biasing member capable of generating a biasing force along the axial direction of the valve stem,
wherein one of the first valve body or the auxiliary seat portion is displaceable in the axial direction relative to the valve stem and is biased toward a corresponding one of the first valve seat or the auxiliary seat surface by the biasing member,
wherein the first valve body is displaceable in the axial direction relative to the valve stem and is biased toward the first valve seat by the biasing member disposed between the first valve body and the valve stem,
wherein the valve stem has a valve-stem-side engagement portion including a projection or a recess projecting or recessed in a radial direction of the valve stem on the distal end side,
wherein the first valve body has a valve-body-side engagement portion including a recess or a projection recessed or projecting in the radial direction so as to engage with the valve-stem-side engagement portion,
wherein the valve-stem-side engagement portion is loosely fitted to the valve-body-side engagement portion so that the first valve body is displaceable in the axial direction relative to the valve stem,
wherein the valve stem has the projection projecting outward in the radial direction as the valve-stem-side engagement portion,
wherein the projection serving as the valve-stem-side engagement portion has:
a first surface directed to a valve-opening side in the axial direction of the valve stem and facing the first valve body; and
a second surface directed to a valve-closing side in the axial direction of the valve stem and facing the first valve body,
wherein a first gap is provided in at least one of a portion between the first surface and the first valve body or a portion between the second surface and the first valve body, and
wherein, when the first valve body is seated on the first valve seat and when the valve stem is at a most valve-closing direction side position, a second gap is provided in each of the portion between the first surface and the first valve body and the portion between the second surface and the first valve body.

* * * * *